United States Patent
Fudaba

(10) Patent No.: US 9,414,277 B2
(45) Date of Patent: Aug. 9, 2016

(54) BASE STATION AND METHOD FOR CONTROLLING BASE STATION

(71) Applicant: FUJITSU LIMITED, Kawasaki-shi, Kanagawa (JP)

(72) Inventor: Nobukazu Fudaba, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 11 days.

(21) Appl. No.: 14/666,941

(22) Filed: Mar. 24, 2015

(65) Prior Publication Data
US 2015/0296432 A1 Oct. 15, 2015

(30) Foreign Application Priority Data
Apr. 9, 2014 (JP) ................................. 2014-080551

(51) Int. Cl.
*H04W 36/00* (2009.01)
*H04W 36/08* (2009.01)
*H04W 52/38* (2009.01)
*H04W 52/40* (2009.01)
*H04W 24/02* (2009.01)
*H04W 84/04* (2009.01)

(52) U.S. Cl.
CPC ............... *H04W 36/08* (2013.01); *H04W 24/02* (2013.01); *H04W 52/38* (2013.01); *H04W 52/40* (2013.01); *H04W 84/045* (2013.01)

(58) Field of Classification Search
None
See application file for complete search history.

(56) References Cited

U.S. PATENT DOCUMENTS

| | | | |
|---|---|---|---|
| 2009/0005043 A1* | 1/2009 | Claussen | H04W 24/02 455/436 |
| 2012/0142355 A1* | 6/2012 | Jha | H04W 36/0061 455/436 |
| 2013/0079008 A1* | 3/2013 | Shinojima | H04W 36/0022 455/436 |
| 2013/0225171 A1* | 8/2013 | Singh | H04W 36/245 455/436 |
| 2013/0229939 A1* | 9/2013 | Teyeb | H04W 36/30 370/252 |

FOREIGN PATENT DOCUMENTS

| | | |
|---|---|---|
| JP | 2012-231236 | 11/2012 |
| JP | 2013-197969 | 9/2013 |

\* cited by examiner

*Primary Examiner* — Shantell L Heiber
(74) *Attorney, Agent, or Firm* — Fujitsu Patent Center

(57) ABSTRACT

A base station includes a first determination unit, a calculation unit, and a control unit. The first determination unit determines whether a terminal in connection with the base station is a terminal passing a cell of the base station. The calculation unit calculates handover frequency of the terminal determined as the passing terminal by the first determination unit. The control unit controls transmission power in accordance with the frequency calculated by the calculation unit.

11 Claims, 15 Drawing Sheets

LIST OF TERMINALS CONNECTED WITHIN PAST 30 MINUTES
($T_{past}$=30 MINUTES)

| INDEX | TERMINAL ID | CONNECTION START TIME | CONNECTION TIME |
|---|---|---|---|
| 0 | U3 | 10:00 | 20 SECONDS |
| 1 | U1 | 09:50 | 7 MIN |
| 2 | U2 | 09:47 | 4 MIN |
| 3 | U1 | 09:33 | 12 MIN |

CELL LIST OF PASSING TERMINAL U1
($T_{past}$=30 MINUTES)

L2

| INDEX | CELL ID | CONNECTION TIME | ACCUMULATED CONNECTION TIME |
|---|---|---|---|
| 0 | C10 | - | - |
| 1 | C20 | 5 MIN | 5 MIN |
| 2 | C30 | 15 MIN | 20 MIN |
| 3 | C40 | 12 MIN | 32 MIN |

PARTIALLY EXTRACTED FROM UE HISTORY INFORMATION

BASE STATION AND METHOD FOR CONTROLLING BASE STATION

CROSS-REFERENCE TO RELATED APPLICATION

This application is based upon and claims the benefit of priority of the prior Japanese Patent Application No. 2014-080551, filed on Apr. 9, 2014, the entire contents of which are incorporated herein by reference.

FIELD

The embodiments discussed herein are related to a base station and a method for controlling the base station.

BACKGROUND

In recent years, use of femto base stations is being expanded for such purposes as offloading the traffic from macro base stations placed outdoors and providing high-speed wireless environments in indoor areas. The femto base stations generally have smaller size and a lower output power than the macro base stations. The femto base stations have an access area (hereinafter referred to as "coverage") of several meters to a few dozen meters. The femto base stations include closed subscriber group (CSG) femto base stations which are placed in general residences and operative in a closed access mode wherein access is limited to specific members. The femto base stations also include Non-CSG femto base stations which are placed inside stores and stations and operative in an open access mode which allows access of any users contracted with the operator of the femto base station.

In the latter Non-CSG femto base stations, a transmission signal transmitted from the indoors may pass through the outer walls and/or windows and leak to the outdoors. In that case, coverage may also be formed in the outdoors, so that outdoor terminals can connect to the femto base stations just like the indoor terminals. When the outdoor terminals connect to the femto base station, a channel capacity and/or a communication rate of the indoor terminals which are the main target of service are deteriorated thereby. When the outdoor terminals pass a femtocell, a handover from adjacent cells to the femtocell and a handover from the femtocell to adjacent cells occur in a short period of time, which causes an increase in signaling load to core networks.

Patent Document 1: Japanese Laid-open Patent Publication No. 2012-231236, and Patent Document 2: Japanese Laid-open Patent Publication No. 2013-197969 are introduced as the Related Art Documents One method to solve the above-stated problem is to perform coverage control. In the coverage control, for example, the femto base stations lower transmission power so that handover frequency within a predetermined time period becomes a specified value or less, and thereby reduce leakage of radio wave to the outdoors. However, unlike the CSG femto base stations, the Non-CSG femto base stations do not identify members. Accordingly, it is difficult for the base stations to determine which terminal made a handover request to their own cells, an indoor terminal or an outdoor terminal. Accordingly, the femto base stations perform coverage control by using the handover frequency of all the terminals that come in and out the coverage of their own cells as an index.

Generally, when the femto base stations lower transmission power, the handover frequency of the outdoor terminals decreases. At the same time, their indoor coverage also decreases, so that indoor handover frequency starts to increase. However, the Non-CSG femto base stations do not distinguish outdoor terminals and indoor terminals. Accordingly, even when the Non-CSG femto base stations observe the handover frequency of all the terminals that come in and out the coverage of their own stations, the details of the handover frequency broken down to handover frequency of the indoor terminals and handover frequency of the outdoor terminals is not available. In the method of simply controlling the handover frequency of all the terminals to be a specified value or less without discriminating indoor and outdoor locations of users, it is difficult for the femto base stations to perform adjustment such as preferential reduction in handover frequency of the outdoor terminals. This makes it hard to perform appropriate coverage control.

FIG. 16 is an explanatory view of the problem in the related technology. In FIG. 16, x-axis represents transmission power P of a femto base station, and y-axis represents a handover frequency H. A solid line L11 expresses change in the handover frequency H of outdoor terminals. A dashed line L12 expresses change in the handover frequency H of indoor terminals. A dashed dotted line L13 expresses change in the handover frequency H of all the terminals. As illustrated in FIG. 16, in order to make the handover frequency H of the outdoor terminals equal to a handover frequency $H_T$ that is a target value, the femto base station may set the transmission power P to an ideal value $P_{ideal}$. In the related control which uses the handover frequency of all the terminals as an index, the femto base stations can minimize the handover frequency of all the terminals. However, since the details of the handover frequency broken down to the indoor and outdoor frequencies are not available, the femto base stations sometimes set a value inadequate as the transmission power P from a perspective of the handover frequency of the indoor terminals. For example, the femto base stations may set the transmission power P to $P_{COV}$ which excessively suppresses the handover frequency of the outdoor terminals. As a result, the handover frequency H of the indoor terminals expressed by the dashed line L2 may increase in contrast.

SUMMARY

According to an aspect of the embodiments, a base station includes: a first determination unit that determines whether a terminal in connection with the base station is a terminal passing a cell of the base station; a calculation unit that calculates handover frequency of the terminal determined as the passing terminal by the first determination unit; and a control unit that controls transmission power in accordance with the frequency calculated by the calculation unit.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Preferred embodiments will be explained with reference to accompanying drawings. The following embodiments do not limit the base station and the method for controlling the base station disclosed by the present application.

Figure 1:
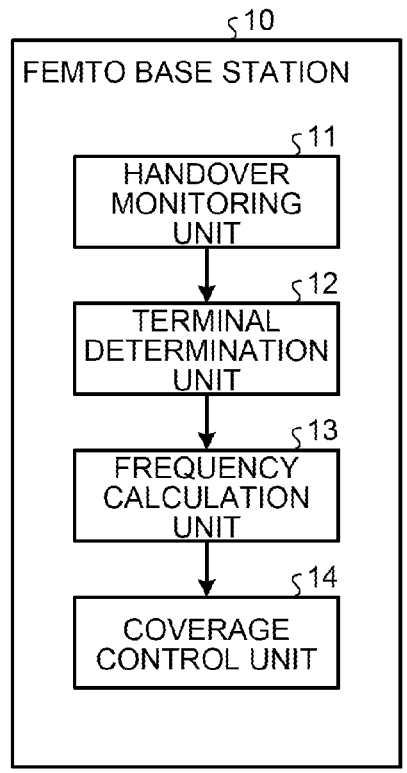
FIG. 1 illustrates the function configuration of a femto base station.

First, the configuration of a femto base station according to one embodiment disclosed by the present application will be described. FIG. 1 illustrates the function configuration of a femto base station 10. The femto base station 10 is operable in a mode (open access mode) which does not limit the terminals that can access the femto base station 10. As illustrated in FIG. 1, the femto base station 10 has a handover monitoring unit 11, a terminal determination unit 12, a frequency calculation unit 13, and a coverage control unit 14. These component members are each connected so that signals and data can be input and output in one way or bidirectionally.

A description will now be given on the premise that the terminals of outdoor users who temporarily pass the cell formed by the femto base station 10 are referred to as "passing terminals" and other terminals are referred to as "staying terminals."

The handover monitoring unit 11 monitors occurrence of handover between its own cell formed by the femto base station 10 and other cells formed by other base stations. The terminal determination unit 12 determines whether or not the handover that occurred is caused by a passing terminal. In accordance with the result of the determination, the terminal determination unit 12 updates the number of handovers of the passing terminal. The frequency calculation unit 13 calculates handover frequency which is the number of handovers that occurred within a predetermined time period, and determines whether or not the calculation result fulfills specified conditions. When the handover frequency fulfills the specified conditions, the coverage control unit 14 increases or decreases the transmission power in accordance with the handover frequency, thereby performing coverage control of the own cell.

Figure 2:
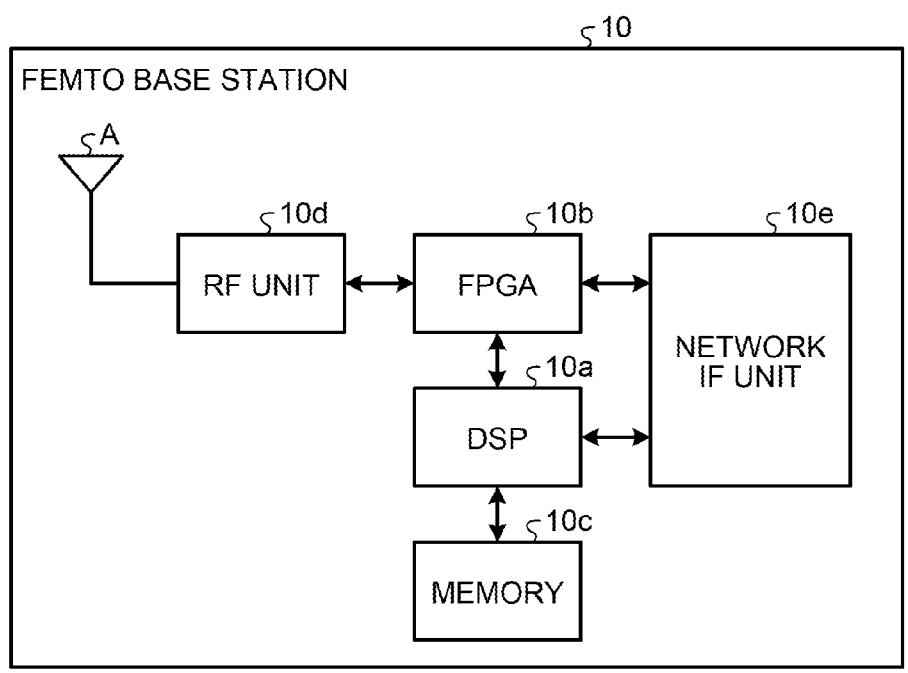
FIG. 2 illustrates the hardware configuration of the femto base station.

FIG. 2 illustrates the hardware configuration of the femto base station 10. As illustrated in FIG. 2, the femto base station 10 has hardware component members including a digital signal processor (DSP) 10a, a field programmable gate array (FPGA) 10b, a memory 10c, a radio frequency (RF) unit 10d, and a network interface (IF) unit 10e. The DSP 10a and the FPGA 10b are directly connected and connected via the network IF unit 10e, such as switches, so that various signals and/or data can be input and output. The RF unit 10d has an antenna A. The memory 10c is constituted of, for example, a random access memory (RAM) such as synchronous dynamic RAMs (SDRAMs), a read only memory (ROM), or a flash memory.

As for the correspondence relation between the function configuration and the hardware configuration, the handover monitoring unit 11, the terminal determination unit 12, and the frequency calculation unit 13 are implemented by an integrated circuit, such as the DSP 10a and FPGA 10b, for example. The calculation result of the handover frequency by the frequency calculation unit 13 is stored in the memory 10c, for example. Furthermore, the coverage control unit 14 is implemented by, for example, the DSP 10a, the FPGA 10b, and the RF unit 10d.

A description will now be given of the operation.

Figure 3:
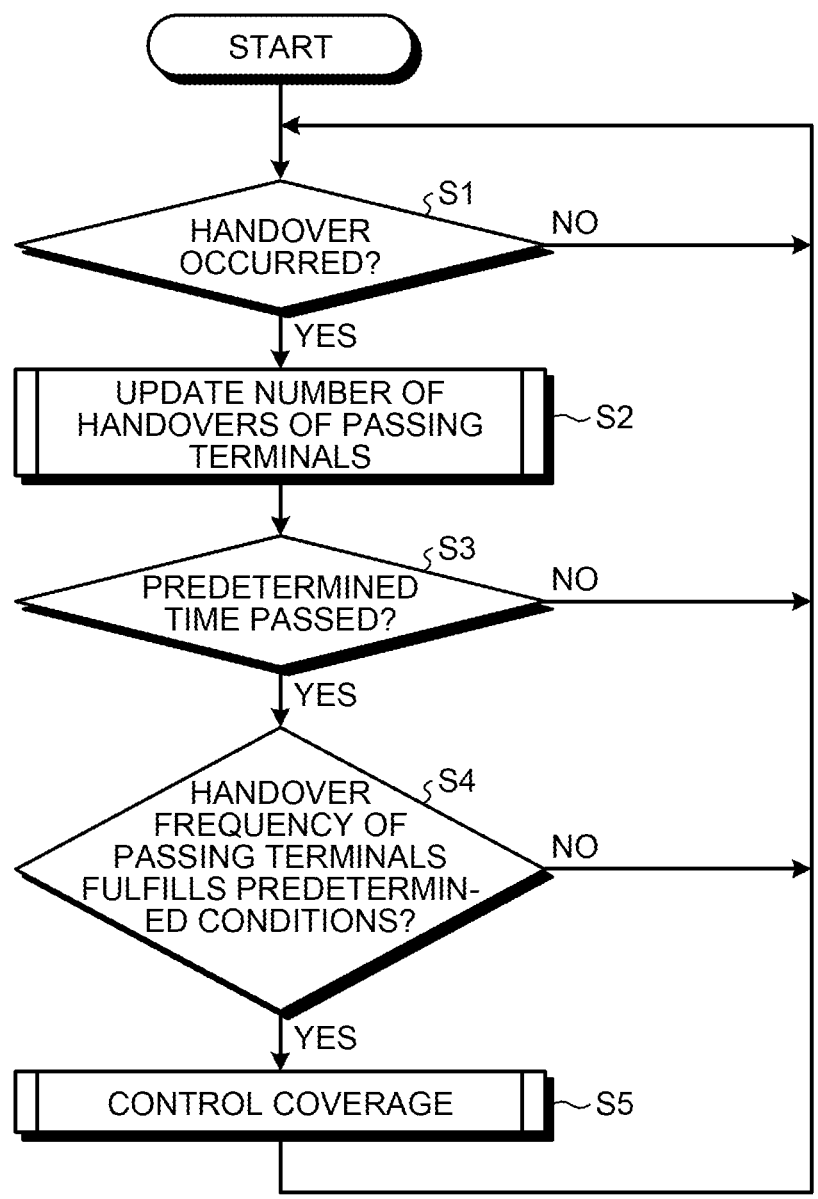
FIG. 3 is a flow chart for describing operation of the femto base station according to an embodiment.

FIG. 3 is a flow chart for describing the operation of the femto base station 10 according to the present embodiment. First in S1, the handover monitoring unit 11 of the femto base station 10 monitors the occurrence of handover between the own cell and other cells. When the handover has occurred as a result of monitoring (Yes in S1), the terminal determination unit 12 determines whether or not the handover is caused by a passing terminal, and appropriately updates the number of handovers of the passing terminals in accordance with the result of the determination (S2).

When predetermined time has passed from the start of monitoring (Yes in S3), the frequency calculation unit 13 calculates the handover frequency which is the number of handovers that occurred in the predetermined time, and determines whether or not the calculation result fulfills specified conditions (S4). When the handover frequency fulfills the specified conditions as a result of the determination (Yes in S4), the coverage control unit 14 increases or decreases transmission power in accordance with the handover frequency to perform coverage control of the own cell (S5).

Although the predetermined time is, for example, about thirty minutes to one hour, the predetermined time may properly be changed corresponding to hours of the day. For example, the predetermined time may be set to about three hours during the period of 22:00 to 6:00 due to the less passing frequency of terminals during nighttime, and be set to about one hour during other hours. This makes it possible to perform more accommodative coverage control corresponding to the degree of congestion of users who carry the terminals.

When a handover does not occur in S1 (No in S1), or when the predetermined time has not passed from the start of the monitoring in S3 (No in S3), the above-described processing of S1 is continuously executed. When the handover frequency does not fulfill the specified conditions in S4 (No in S4), the above-described processing of S1 is also continuously executed in a similar manner.

Figure 4:
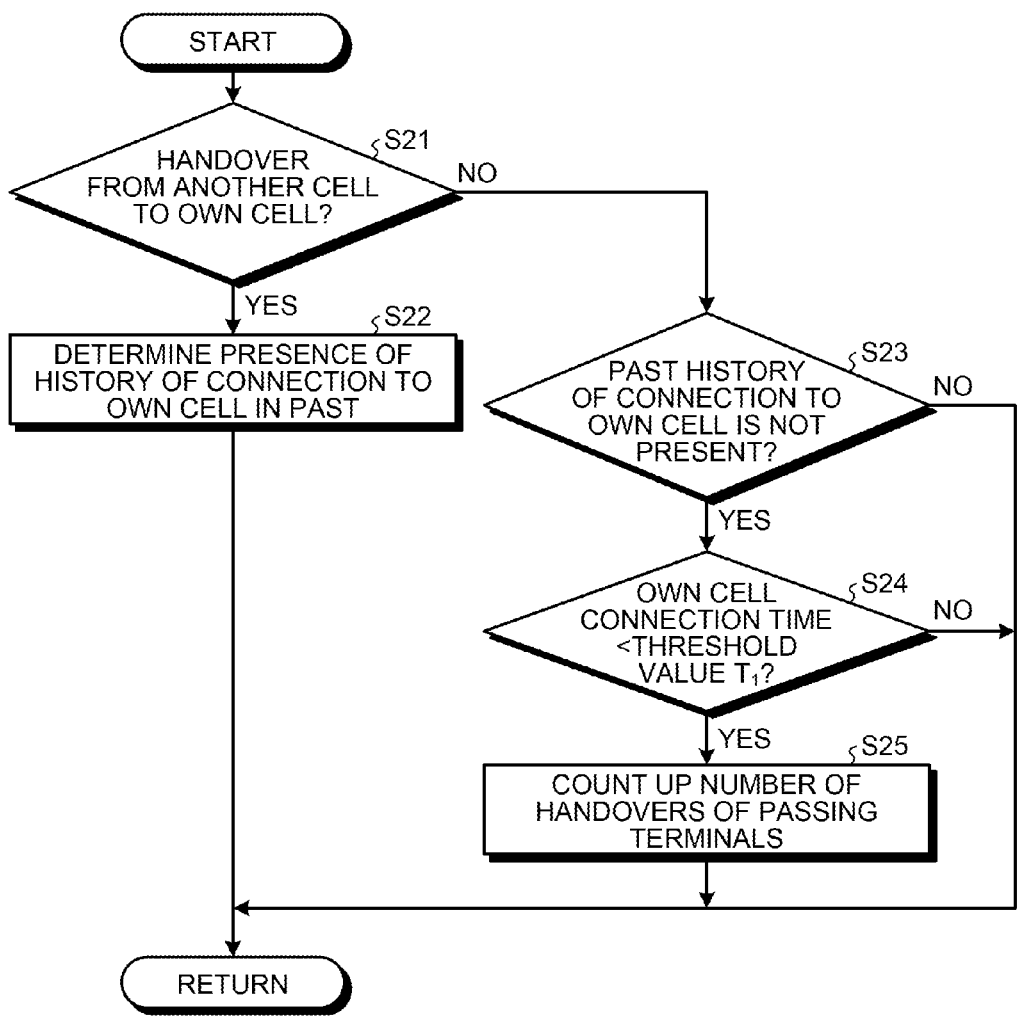
FIG. 4 is a flow chart for describing update processing to update the number of handovers according to the present embodiment.

Next, the processing of S2 will be described in detail. FIG. 4 is a flow chart for describing update processing to update the number of handovers according to the present embodiment. In S21, the terminal determination unit 12 determines whether or not the handover that occurred is caused by a terminal entering to the own cell from another cell. When the handover that occurred is caused by the terminal entering to the own cell from another cell as a result of the determination (Yes in S21), the terminal determination unit 12 starts to measure the time of current connection to the own cell. The terminal determination unit 12 determines whether or not the terminal handed over to the own cell had connected to the own cell (presence of connection history) in past specified time $T_{past}$ (for example, about five minutes to one hour) (S22). At the end of S22, the processing shifts to S3 of FIG. 3.

When the handover that occurred is not caused by the terminal entering to the own cell from another cell in S21 (No in S21), that is, when the handover is from the own cell to another cell, the processing subsequent to S23 is executed. In S23, the terminal determination unit 12 determines whether or not the terminal handed over to another cell is determined to have no history of connection to the own cell in the past in S22.

When the history of connection to the own cell in the past predetermine time $T_{past}$ is not present as a result of the determination (Yes in S23), the terminal determination unit 12 determines whether or not the time of current connection to the own cell is less than a threshold value $T_1$ (for example, about one to five minutes) (S24). When the connection time is less than the threshold value $T_1$ as a result of the determination (Yes in S24), the terminal determination unit 12 determines that the handed-over terminal is a passing terminal, and increments a counter that stores the number of handovers of passing terminals by one (S25).

When the history of connection to the own cell in the past predetermined period $T_{past}$ is present in S23 (No in S23), or when the connection time is equal to or more than the threshold value $T_1$ in S24 (No in S24), the subsequent processing is omitted and the processing of S3 in FIG. 3 is executed.

Accordingly, among the terminals handed over from other cells to the own cell, the terminal which does not have the history of connection to the own cell in the past predetermined period $T_{past}$ and whose time of current connection to the own cell is less than the threshold value $T_1$ is determined as a passing terminal by the terminal determination unit 12.

The determination processing of S22 and S23 is executed based on the speculation that the passing terminal is highly likely to have no connection history in the past predetermined period $T_{past}$ unless the passing terminal frequently travels the vicinity of a cell C10 of the femto base station 10. In the determination processing of S24, the terminals which have no connection history but have a long connection time are filtered out from the passing terminals. As a result, when a client terminal (staying terminal) which enters into a store from the outdoors and stays in the femtocell C10 for predetermined time is handed over, it becomes possible to prevent misidentification of this handover as a handover caused by the terminal (passing terminal) which is just passing the femtocell.

There are two methods for the terminal determination unit 12 to determine the presence of the history of connection to the own cell in S22 and S23. In the first method, the femto base station 10 uses an ID of the terminal which is connected to the own cell. In the second method, the femto base station 10 uses an ID of the cell to which the terminal is connected.

Now, the first method will be described. In the first method, the femto base station 10 stores a list of IDs (identifiers) of the terminals connected to the own cell. When a terminal (for example, a terminal U3) is handed over from another cell to the own cell, the femto base station 10 determines whether or not the terminal (U3) has a history of connection to the own cell based on whether or not the ID (for example, U3) of the terminal is present on the list.

Figure 5:
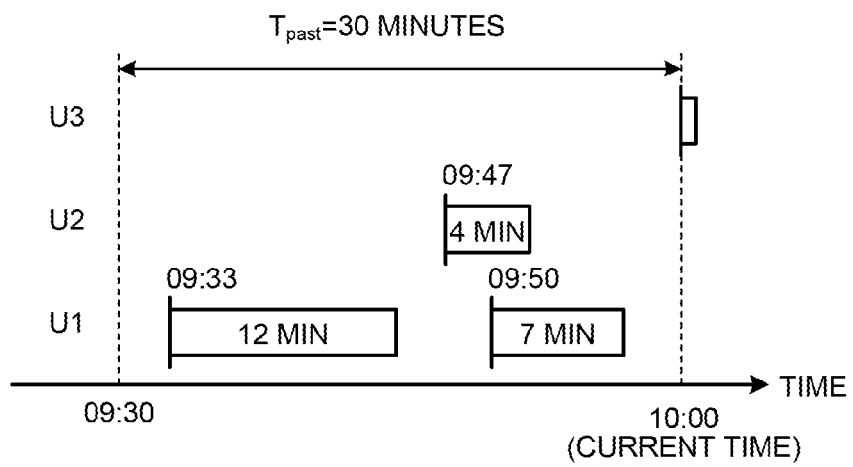
FIG. 5 illustrates one example of a terminal list for determining the presence of a connection history with use of terminal IDs.

The terminal determination unit 12 stores the IDs of the terminals connected to the own cell during a period from the past predetermined time $T_{past}$ up to the present time. FIG. 5 illustrates one example of a terminal list L1 for determining the presence of the connection history with use of the terminal IDs. In FIG. 5, the predetermined time $T_{past}$ is set to thirty minutes. In FIG. 5, the terminal ID, connection start time, and connection time are each recorded in a reverse chronological order of the time to start connection to the femto base station 10. The first line (index "0") is reserved for the terminal (terminal U3 in this embodiment) that is a target of determination of whether or not the history of connection to the own cell is present. The size (the number of lines) of the terminal list L1 of FIG. 5 depends on the number of terminals whose connection start time is within a period from the predetermined time $T_{past}$ up to the present time (10:00 in this embodiment). Therefore, in the present embodiment, connection information on the terminals U1 to U3 whose connection start time is 9:30 to 10:00 is stored in the terminal list L1.

In S22 and S23, the terminal determination unit 12 determines whether or not an ID of the terminal corresponding to an index "0" is present after the index "1" in the terminal list L1. If the ID is present, the terminal determination unit 12 determines that the history of connection to the own cell is present. In the example illustrated in FIG. 5, the terminal ID "U3" is not present in the indexes "1" to "3" after the index "1." Accordingly, the terminal determination unit 12 determines that the terminal U3 has no history of connection to the own cell C10.

Next, the second method will be described. In the second method, when a terminal (for example, a terminal U1) is handed over from another cell to the own cell, the femto base station 10 determines whether or not the terminal U1 has a history of connection to the own cell based on whether or not the connection history information on the terminal U1 includes an identifier of the own cell.

The terminal determination unit 12 uses the past connection history of the terminal itself which has been handed over to the own cell C10. In this embodiment, the case of using UE history information at the time of terminal handover in Long Term Evolution (LTE) system will be described. The UE history information is provided from a previous base station which handed over the terminal to the base station which receives the handed-over terminal. The UE history information is a list that records past connection destinations of the terminal that has been handed over to the own cell. When the terminal is handed over to another cell, the previous base station adds information on its own cell to the first line of the list, and provides the list to a femto base station that is a handover destination. The information to be added includes, for example, a global cell ID (for example, public land mobile network (PLMN) ID+ cell ID), a cell type (such as very small, small, medium, large, . . . ), and connection time in each cell (for example, 0 to 4095 seconds).

Figure 6:
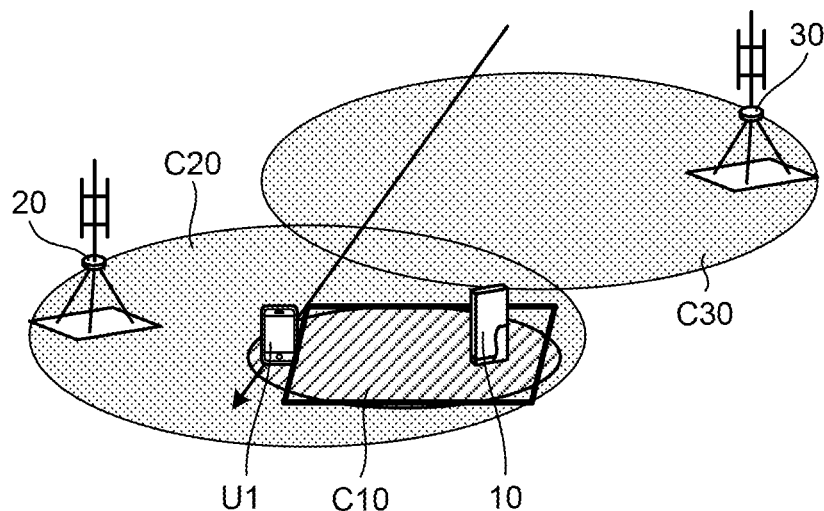
FIG. 6 illustrates one example of a cell list for determining the presence of the connection history with use of cell IDs.

Accordingly, the terminal determination unit 12 extracts part of the UE history information in order from the first line of the UE history information up to the line where accumulated connection time that is the sum of connection time in each cell is closest to the predetermined time $T_{past}$. As in the first method, the terminal determination unit 12 adds information on the own cell C10 to the index "0" to form a cell list L2. FIG. 6 illustrates one example of the cell list L2 for determining the presence of the connection history with use of cell IDs. As illustrated in FIG. 6, the cell list L2 stores connection time and accumulated connection time of the passing terminal for each cell ID of the connection destination.

In S22 and S23, the terminal determination unit 12 determines whether or not an ID of the own cell corresponding to the index "0" is present after the index "1" in the cell list L2. If the ID is present, the terminal determination unit 12 determines that the history of connection to the own cell is present. In the example illustrated in FIG. 6, the ID of the own cell "C10" is not present in the indexes "1" to "3" after the index "1." Accordingly, the terminal determination unit 12 determines that the terminal U1 has no history of connection to the own cell C10.

Figure 7:
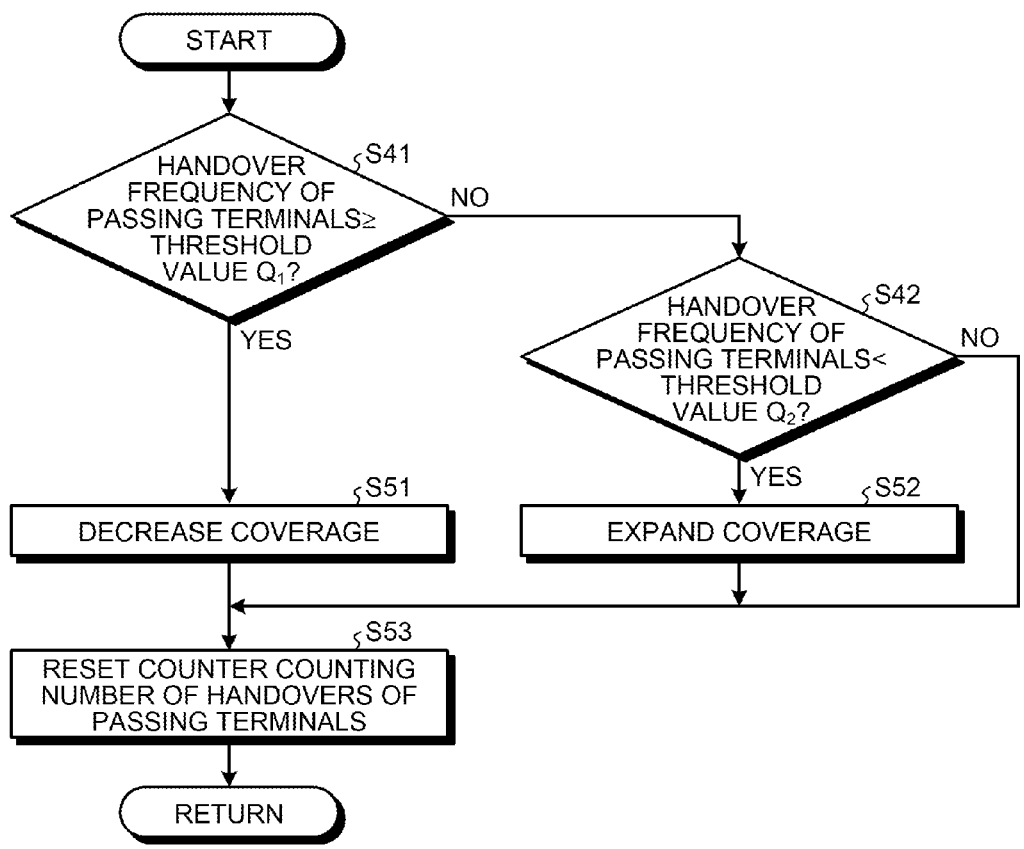
FIG. 7 is a flow chart for describing coverage control processing according to the present embodiment.

Next, the processing of S4 and S5 will be each described in detail. FIG. 7 is a flow chart for describing coverage control processing according to the present embodiment. In S41, the frequency calculation unit 13 compares the handover frequency of the passing terminals with a threshold value $Q_1$. If the handover frequency ≥ threshold value $Q_1$ is satisfied as a result of the comparison (Yes in S41), the coverage control unit 14 reduces the transmission power of the femto base station 10 by a specified amount $\Delta_1$ to decrease the coverage (S51).

If the handover frequency of the passing terminals < threshold value $Q_1$ is satisfied as a result of the comparison in S41 (No in S41), the frequency calculation unit 13 further compares the handover frequency of the passing terminals with a threshold value $Q_2$. If the handover frequency < threshold value $Q_2$ is satisfied as a result of the comparison (Yes in S42), the coverage control unit 14 determines that the handover frequency of the passing terminals is already sufficiently low, and increases the transmission power of the femto base station 10 by a specified amount $\Delta_2$ to expand the coverage (S52).

After the processing to decrease and expand the coverage is finished, the coverage control unit 14 resets the counter counting the number of handovers of the passing terminals to "0" (S53). Then, the processing returns to the processing of step S1 in FIG. 3.

The threshold values $Q_1$ and $Q_2$ vary depending on, for example, the installation environments of the femto base station, the number of users per unit area (population density), the amount of user traffic, and walking speed of users. For example, the threshold value $Q_1$ is about ten to a hundred terminals per hour. For example, the threshold value $Q_2$ is about one to ten terminals per hour. The specified amounts $\Delta_1$ and $\Delta_2$ may be an identical value (for example, about three to five dB). However, in order to minimize the influence of interference to the peripheral cells at the time of expanding the coverage, the specified amount $\Delta_2$ for increasing the transmission power is preferably a value (for example, one dB) smaller than the specified amount $\Delta_1$ (for example, three dB) that is for decreasing the transmission power.

Figure 8:
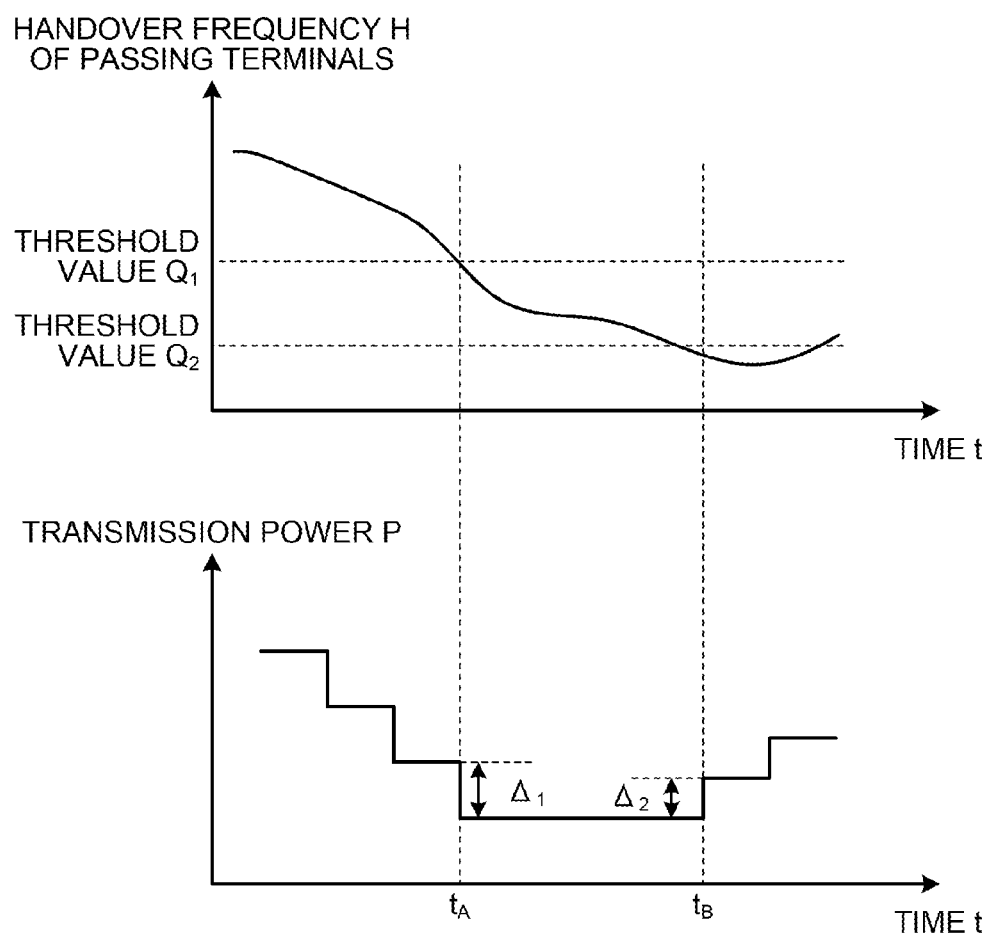
FIG. 8 illustrates a temporal change in the handover frequency of passing terminals and the transmission power of the femto base station.

FIG. 8 illustrates a temporal change in the handover frequency H of the passing terminals and the transmission power P of the femto base station. As illustrated in FIG. 8, since the handover frequency H of the passing terminals is equal to or more than the threshold value $Q_1$ up to time $t_A$, the coverage control unit 14 decreases the coverage of the own cell C10 in stages by reducing the transmission power P by a specified amount $\Delta_1$ at a time. Then, when the handover frequency H of the passing terminals becomes less than the threshold value $Q_1$ after a lapse of time $t_A$, the coverage control unit 14 determines that coverage control can be stopped until the handover frequency H becomes less than the threshold value $Q_2$ (No in S42 in FIG. 7) or the handover frequency H becomes again larger than the threshold value $Q_1$. As a result, a fixed transmission power P is maintained between time $t_A$ and $t_B$. Then, when the handover frequency H of the passing terminals becomes less than the threshold value $Q_2$ after a lapse of time $t_B$, the coverage control unit 14 expands the coverage of the own cell C10 in stages by increasing the transmission power P by a specified amount $\Delta_2$ at a time.

As described in the foregoing, the femto base station 10 has the terminal determination unit 12, the frequency calculation unit 13, and the coverage control unit 14. The terminal determination unit 12 determines whether or not the terminal in connection with the femto base station 10 is a terminal (passing terminal) which temporarily passes the cell of the femto base station 10. The frequency calculation unit 13 calculates the handover frequency of the terminal determined as the passing terminal by the terminal determination unit 12. The coverage control unit 14 controls the transmission power in accordance with the frequency calculated by the frequency calculation unit 13. For example, when a handover from another cell to the own cell occurs, the terminal determination unit 12 may determine the terminal, which has no history of connection to the femto base station 10 in the past and whose time of current connection to the femto base station 10 is less than the threshold value $T_1$, as a passing terminal.

More specifically, the femto base station 10 controls coverage based on the presence of the history of connection to the own station in past predetermined time and based on the time of current connection to the own station. As a consequence, the femto base station 10 suppresses avoidable handover caused by the terminals (outdoor users) which temporarily pass the cell C10. This leads to reduction in connection to the femto base station 10 of the terminals that the femto base station 10 need not accommodate. As a result, the channel capacity for staying terminals (indoor users) can be secured. This also leads to reduction in the signaling load relating to the handover processing in the core networks.

First Modification

A first modification will now be described. Among the terminals present in the cell C10 formed by the femto base station 10, the terminals other than the passing terminals are classified as a staying terminal. However, without being limited to stationary terminals, the staying terminals may include those moving indoor at low speed, and those moving to/from buildings. Therefore, when the femto base station 10 performs coverage control only for reducing the handover frequency of the passing terminals, the influence of the handover of the staying terminals may increase depending on the installation location and/or user distribution of the indoor femto base station 10. Accordingly, in the first modification, the femto base station 10 measures an index value relating to the staying terminals for predetermined time, and performs coverage control based on the result of measurement in addition to the handover frequency of the passing terminals. This makes it possible to perform the coverage control in consideration of the influence of the handover by the staying terminals. Hereinafter, a description will be given with a focus being placed on difference from the above-described embodiment.

Figure 9:
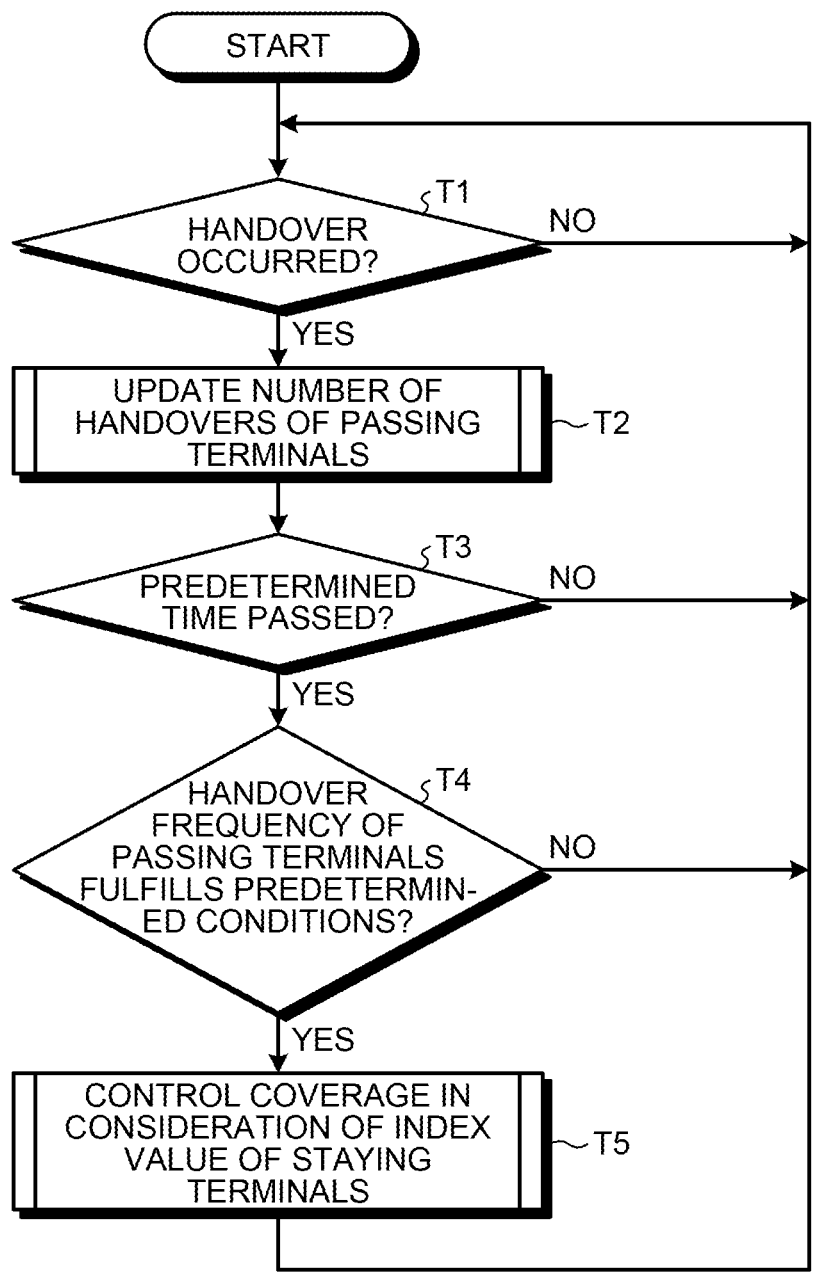
FIG. 9 is a flow chart for describing operation of a femto base station according to a first modification.

A femto base station according to the first modification has the same configuration as the femto base station 10 according to the embodiment illustrated in FIGS. 1 and 2. Therefore, in the first modification, component members similar to those illustrated in the above-described embodiment are designated by similar reference numerals to omit illustration and a detailed description thereof. FIG. 9 is a flow chart for describing operation of the femto base station 10 according to the first modification. Since FIG. 9 includes the same processing as FIG. 3 which is referred in description of the operation according to the above-described embodiment, common steps are designated by reference numerals having an identical tailing numeral, and a detailed description thereof is omitted. Specifically, the processing of steps T1 to T4 in FIG. 9 corresponds to processing of steps S1 to S4 illustrated in FIG. 3, respectively.

In T5 peculiar to the first modification, the coverage control unit 14 of the femto base station 10 performs coverage control by using an index value (for example, the handover frequency of the staying terminals) indicative of the state within the own cell C10 as an index value relating to the staying terminals. For example, when the femto base station 10 is installed at indoor locations which are close to outdoor locations, such as the vicinity of windows, a large amount of radio wave leak to the outdoors, which causes high handover frequency of the passing terminals. Under such an environment, if the femto base station 10 performs the coverage control by using only the handover frequency of the passing terminals as an index as in the above-described embodiment, the transmission power is excessively decreased and indoor coverage is narrowed. As a result, the handover frequency of the staying terminals start to increase. Therefore, the coverage control unit 14 controls the coverage in consideration of not only the handover frequency of the passing terminals but also the handover frequency of the staying terminals.

Figure 10:
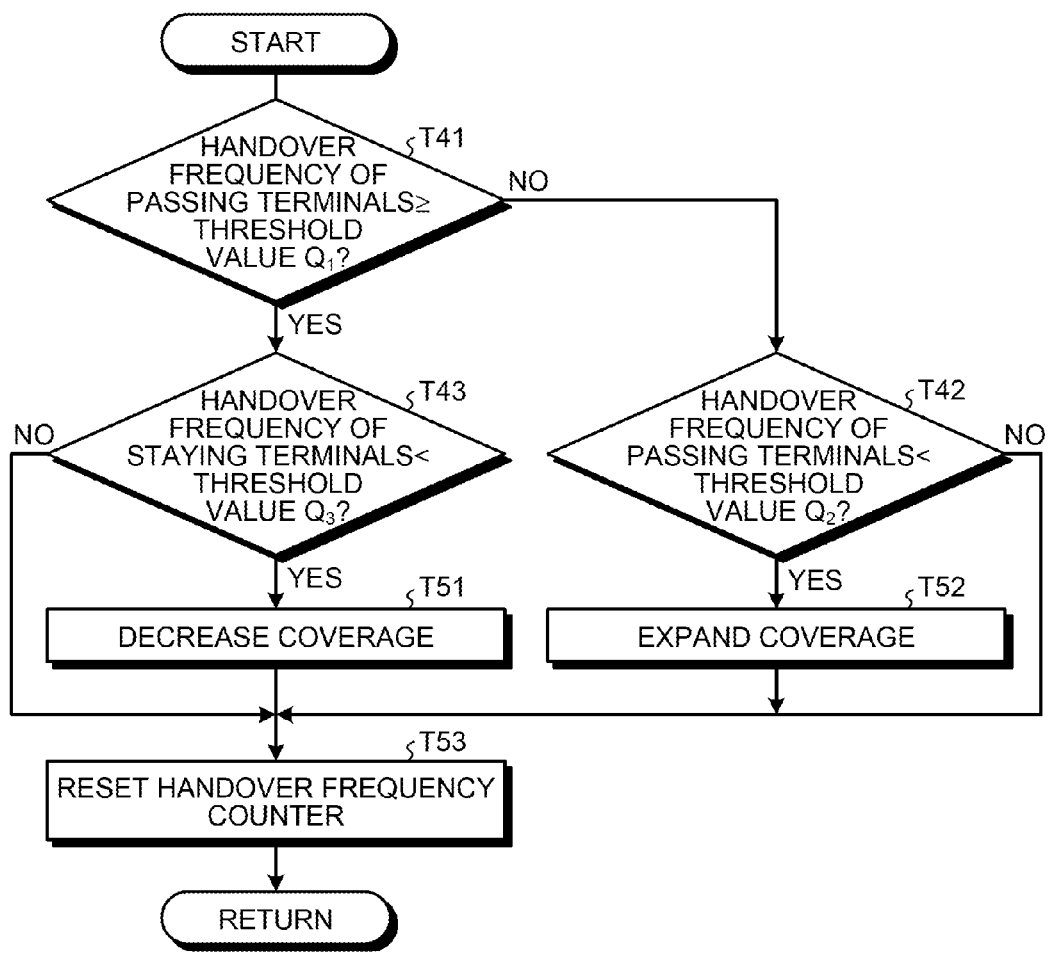
FIG. 10 is a flow chart for describing coverage control processing according to the first modification.

FIG. 10 is a flow chart for describing coverage control processing according to the first modification. Since FIG. 10 includes the same processing as FIG. 7 which is referred in description of the operation according to the above-described embodiment, common steps are designated by reference numerals having an identical tailing numeral, and a detailed description thereof is omitted. Specifically, the processing of steps T41, T42, and T51 to T53 in FIG. 10 corresponds to processing of steps S41, S42, and S51 to S53 illustrated in FIG. 7, respectively.

In T43 peculiar to the first modification, the frequency calculation unit 13 of the femto base station 10 determines execution propriety of power control that is to decrease the coverage which results in increase in the handover frequency of the staying terminals. The execution propriety is determined in accordance with the handover frequency of the staying terminals. More specifically, the femto base station 10 skips the processing of T51 so as not to decrease the coverage, if the handover frequency of the passing terminals threshold value $Q_1$ is satisfied (Yes in T41) but the handover frequency of the staying terminals <threshold value $Q_3$ is not satisfied (No in T43).

Or alternatively, in still another modification, the femto base station 10 may delay the timing of handover of the staying terminals from the own cell to other cells, if the handover frequency of the staying terminals<threshold value $Q_3$ is not satisfied (No in T43). More specifically, the femto base station 10 may further has a handover delay unit 15 that controls to delay the timing of handover of only the staying terminals.

Figure 11:
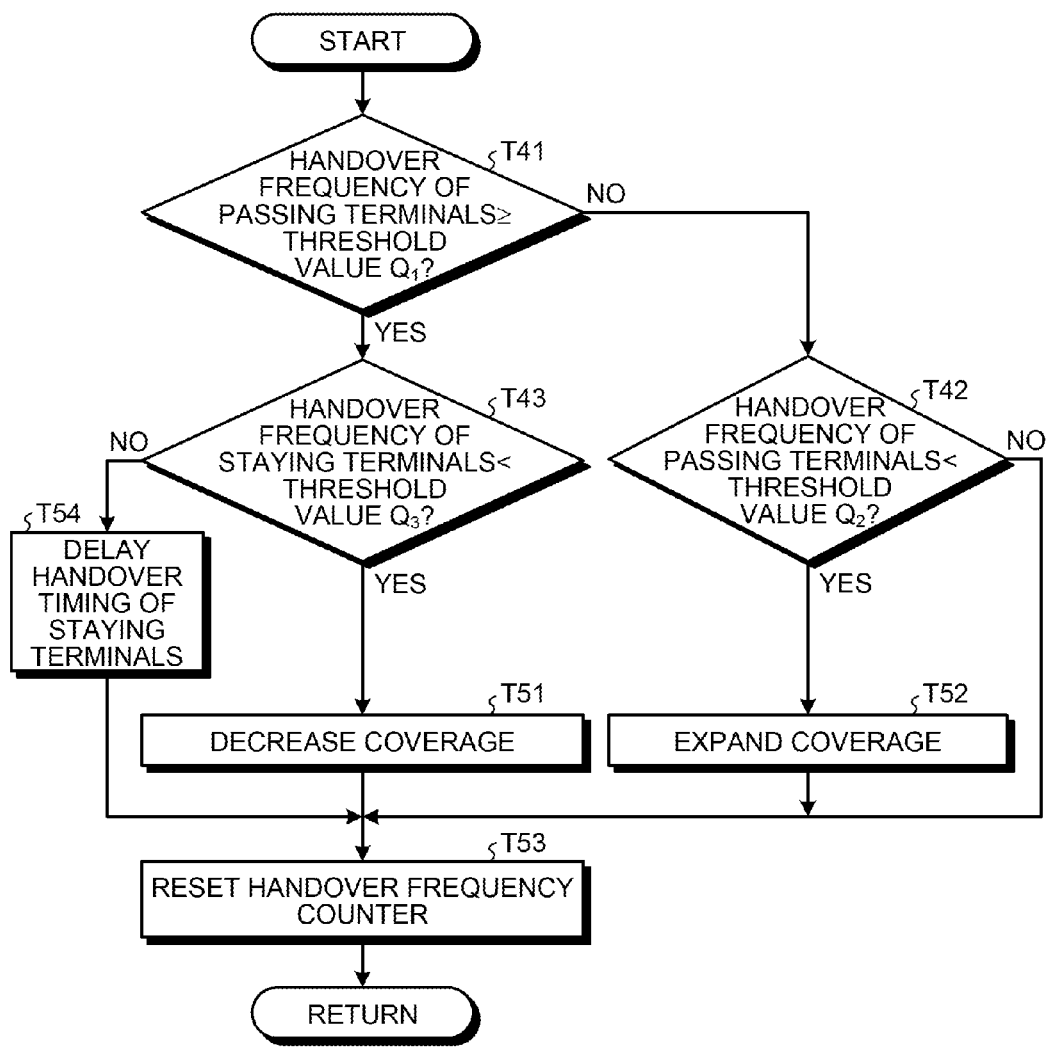
FIG. 11 is a flow chart for describing the coverage control processing according to another aspect of the first modification.

FIG. 11 is a flow chart for describing the coverage control processing according to another aspect of the first modification. As illustrated in FIG. 11, in T54, the handover delay unit 15 delays the timing of handing over the staying terminals in the cell C10 to other cells. Specifically, the handover delay unit 15 commands the staying terminals to change (tighten) reporting conditions (for example, parameters), which are the conditions for the terminals to report measurement information to the femto base station 10, the measurement information being for use in the handover. This makes it difficult to hand over the staying terminals from the own cell to other cells. Or the femto base station 10 may change (tighten) conditions (for example, parameters) for determining execution of handover of only the staying terminals based on the measurement information reported from the terminals. This also makes it possible to delay the timing of handover of the staying terminals.

Figure 12:
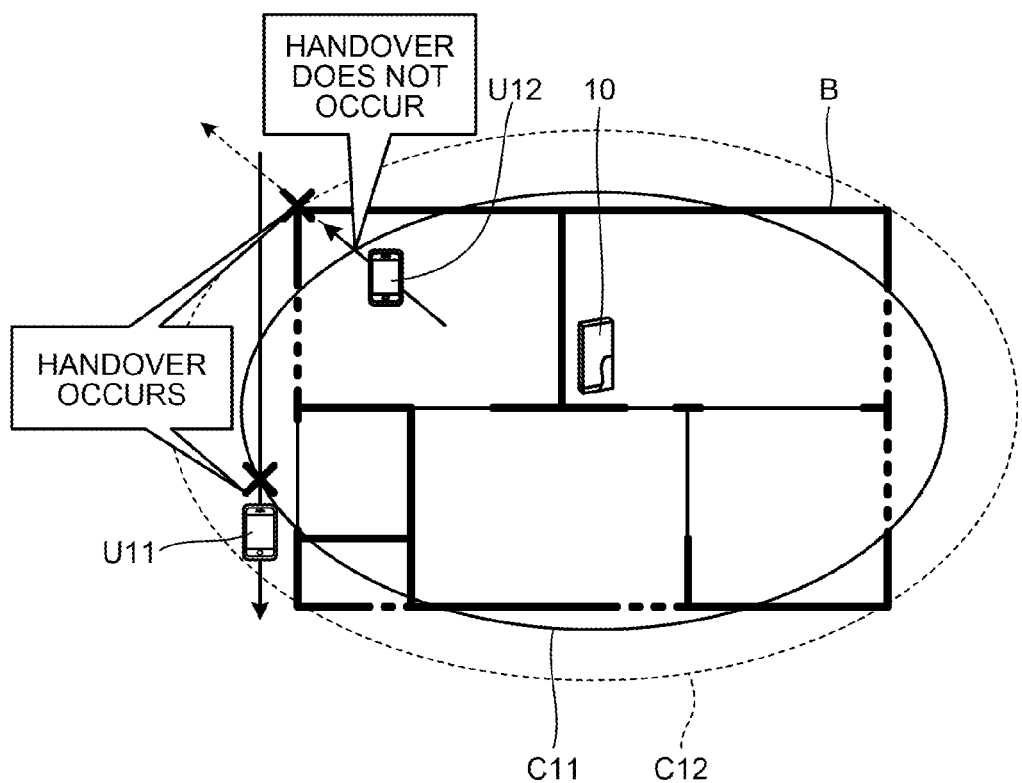
FIG. 12 illustrates difference in coverages attributed to delay of the handover timing of staying terminals.

FIG. 12 illustrates difference in coverages C11 and C12 attributed to delay of the handover timing of a staying terminal U12. As illustrated in FIG. 12, the femto base station 10 placed inside a building B forms a cell with a coverage C11. The above-stated delay control makes the start timing of handover of the staying terminal U12 later than handover of a passing terminal U11. As a consequence, in the coverage of the cell formed by the femto base station 10, the coverage C12 of the staying terminal U12 becomes virtually larger than the coverage C11 of the passing terminal U11. This further suppresses the handover frequency of the staying terminal U12.

Here, in S1 and S2 of FIG. 3, the frequency calculation unit 13 calculates the handover frequency of the staying terminals together with the handover frequency of the passing terminals before T43 of FIG. 11. Or the frequency calculation unit 13 may calculate the handover frequency of the staying terminals as the handover frequency of the terminals other than the passing terminals as in the case of the handover of the terminals whose results of the steps S23 and S24 in FIG. 4 are No. Furthermore, the frequency calculation unit 13 may also calculate the handover frequency of the staying terminals as the handover frequency of the staying terminals whose time of connection to the own cell is less than the threshold value $T_1$, among the terminals whose results of the step S23 in FIG. 4 is No. As a consequence, among the handovers of the staying terminals, only the handovers of the terminals connected only for a short time can be extracted as a target for handover frequency calculation.

Second Modification

A second modification will now be described. In the first modification, the femto base station 10 determines whether or not the handover frequency fulfills the predetermined conditions only with respect to the passing terminals. In the second modification, whether or not the handover frequency fulfills the predetermined conditions is determined for all the terminals. Hereinafter, a description will be given with a focus being placed on difference from the above-described first modification.

Figure 13:
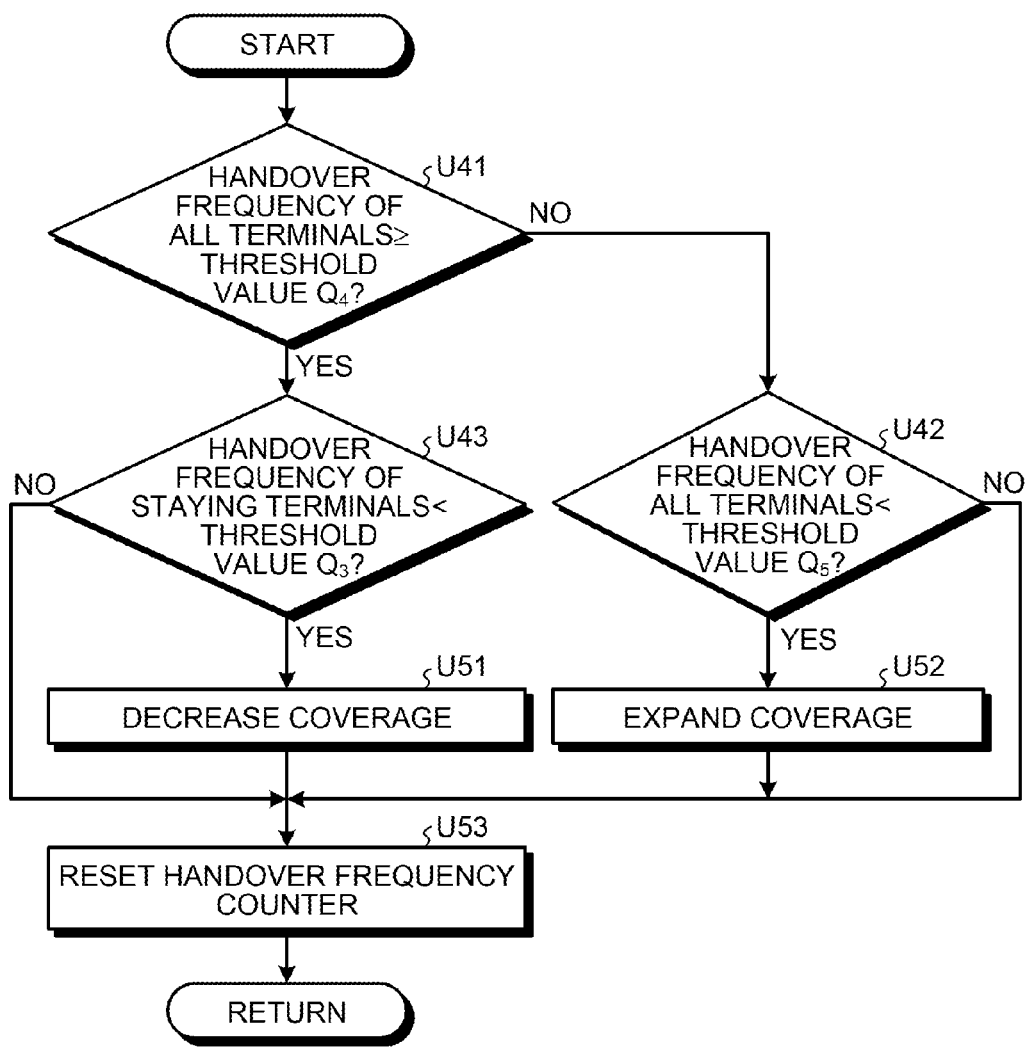
FIG. 13 is a flow chart for describing the coverage control processing according to a second modification.

A femto base station according to the second modification has the same configuration as the femto base station 10 according to the first modification. Therefore, in the second modification, component members similar to those illustrate in the first modification are designated by similar reference numerals to omit illustration and a detailed description thereof. FIG. 13 is a flow chart for describing the coverage control processing according to the second modification. Since FIG. 13 includes the same processing as FIG. 10 which is referred in description of the operation according to the above-described first modification, common steps are designated by reference numerals having an identical tailing numeral, and a detailed description thereof is omitted. Specifically, the processing of steps U43 and U51 to U53 in FIG. 13 corresponds to processing of steps T43 and T51 to T53 illustrated in FIG. 10, respectively.

In U41 peculiar to the second modification, the frequency calculation unit 13 compares the handover frequency of all the terminals (passing terminals and staying terminals) present in the cell C10 with a threshold value $Q_4$. If the handover frequency threshold value $Q_4$ is satisfied as a result of the comparison (Yes in U41), the processing shifts to U43. If the handover frequency <threshold value $Q_4$ is satisfied (No in U41), the processing shifts to U42. In U42, the frequency calculation unit 13 further compares the handover frequency of all the terminals with a threshold value $Q_5$. If the handover frequency <threshold value $Q_5$ is satisfied as a result of the comparison (Yes in U42), the coverage control unit 14 determines that the handover frequency of all the terminals is already sufficiently low, and increases the transmission power of the femto base station 10 by a specified amount $\Delta_2$ to expand the coverage (U52). As a consequence, the total signaling load amount to the core networks caused by the handover is further reduced.

Third Modification

A third modification will next be described. When the femto base station 10 performs coverage control only for reduction in the handover frequency of passing terminals, insufficient indoor coverage is generated depending on the installation location and/or user distribution. This may lead to deteriorated communication quality in the staying terminals and decline in communication rates such as throughputs. Accordingly, in the third modification, the femto base station 10 uses a statistic such as communication quality and a communication rate (for example, a throughput) of staying terminals as an index value relating to the staying terminals. The femto base station 10 performs coverage control so that the statistic becomes equal to or more than a specified threshold value. More specifically, in the first and second modifications, the femto base station 10 uses the handover frequency as an index value indicating the state within the own cell C10. However, in the third modification, the femto base station 10 additionally uses a statistic of receiving quality, communication rates of the terminals (for example, staying terminals) in connection, or the like for a specified period as another index value. Hereinafter, a description will be given with a focus being placed on difference from the above-described first and second modifications.

Figure 14:
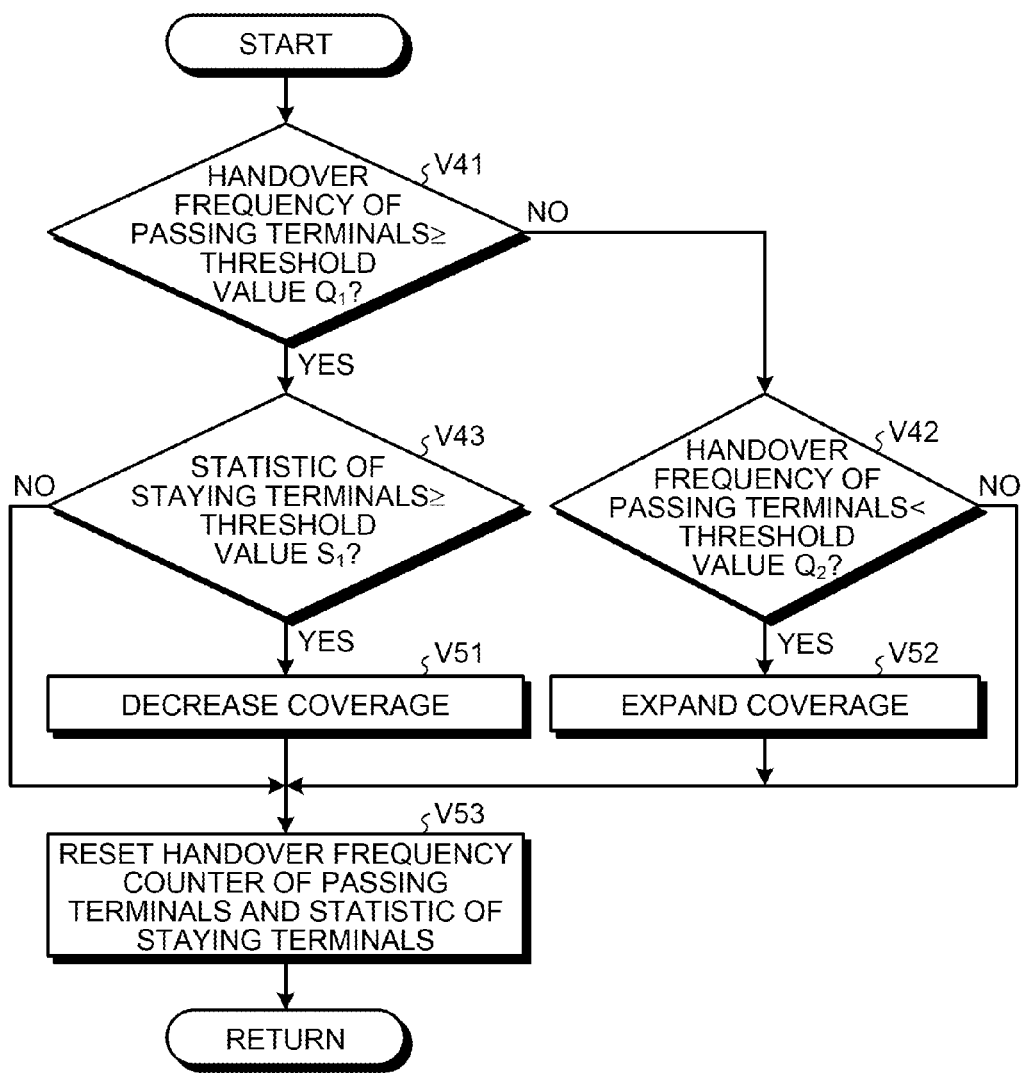
FIG. 14 is a flow chart for describing the coverage control processing according to a third modification.

A femto base station according to the third modification has the same configuration as the femto base station 10 according to the first and second modifications. Therefore, in the third modification, component members similar to those illustrate in the first and second modifications are designated by similar reference numerals to omit illustration and a detailed description thereof. FIG. 14 is a flow chart for describing the coverage control processing according to the third modification. Since FIG. 14 includes the same processing as FIG. 10 which is referred in description of the operation according to the above-described first modification, common steps are designated by reference numerals having an identical tailing numeral, and a detailed description thereof is omitted. Specifically, the processing of steps V41, V42, and V51 to V53 in FIG. 14 corresponds to processing of steps T41, T42, and T51 to T53 illustrated in FIG. 10, respectively.

In V43 peculiar to the third modification, when the statistic of staying terminals ≥threshold value $S_1$ is satisfied (Yes in V43), the frequency calculation unit 13 of the femto base station 10 decreases the coverage since the quality and/or the rate of communication can be maintained with the decreased coverage (V51). Contrary to the above case, when the statistic of staying terminals <threshold value $S_1$ is satisfied (No in V43), the frequency calculation unit 13 omits the processing of V51 and does not decrease the coverage.

Here, calculation processing of the statistic includes, for example, calculation processing of an average value and/or calculation processing of cumulative distribution. In the cumulative distribution, lower throughputs (for example, lower 5% throughputs) may be defined as cell edge throughputs. In this case, if the cell edge throughputs are less than a threshold value (No in V43), further coverage decrease is likely to cause further decline in the cell edge throughputs. Therefore, the femto base station 10 omits the processing of V51 which reduces transmission power so as to avoid the further coverage decrease. This makes it possible to perform coverage control with due consideration to an influence of the coverage decrease for lowering the handover frequency, the influence being exerted upon the communication quality and/or communication rates of the staying terminals.

Fourth Modification

A fourth modification will now be described. Assume the case where, for example, there are many terminals connected to the femto base station 10 placed in shopping malls and the like, and the number of terminal connections already reaches a maximum connectable number. In such a case, if the coverage is expanded, the femto base station 10 fails to respond to new handover requests issued by terminals of other cells. This may cause the situation in which new terminals are not accessible to the femto base station 10. In order to avoid this problem, the femto base station 10 may further include a terminal count determination unit 16 that determines whether or not the number of the terminals connected to the own station is equal to or more than a threshold value. Hereinafter, a description will be given with a focus being placed on difference from the above-described embodiment.

Figure 15:
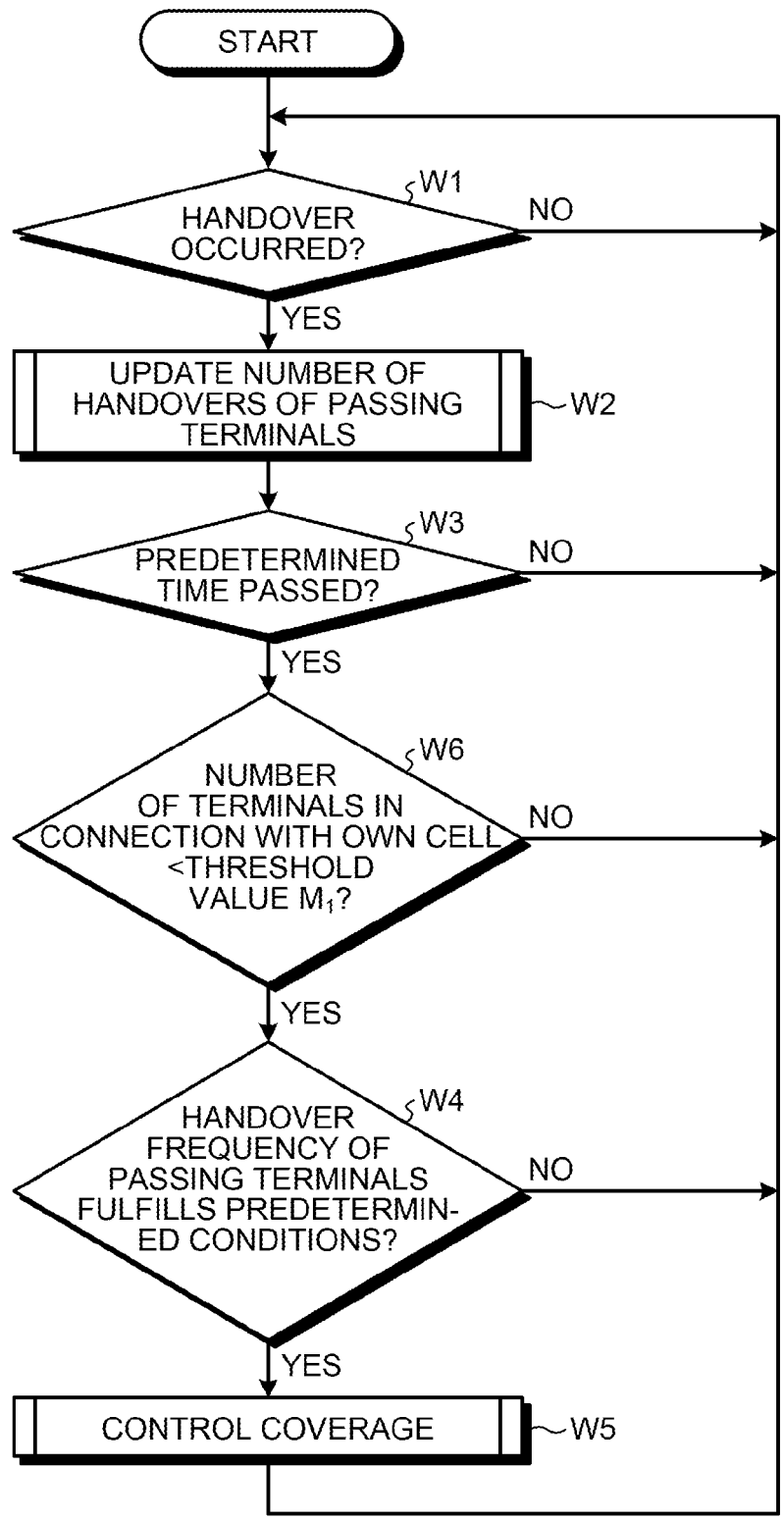
FIG. 15 is a flow chart for describing operation of a femto base station according to a fourth modification.
Figure 16:
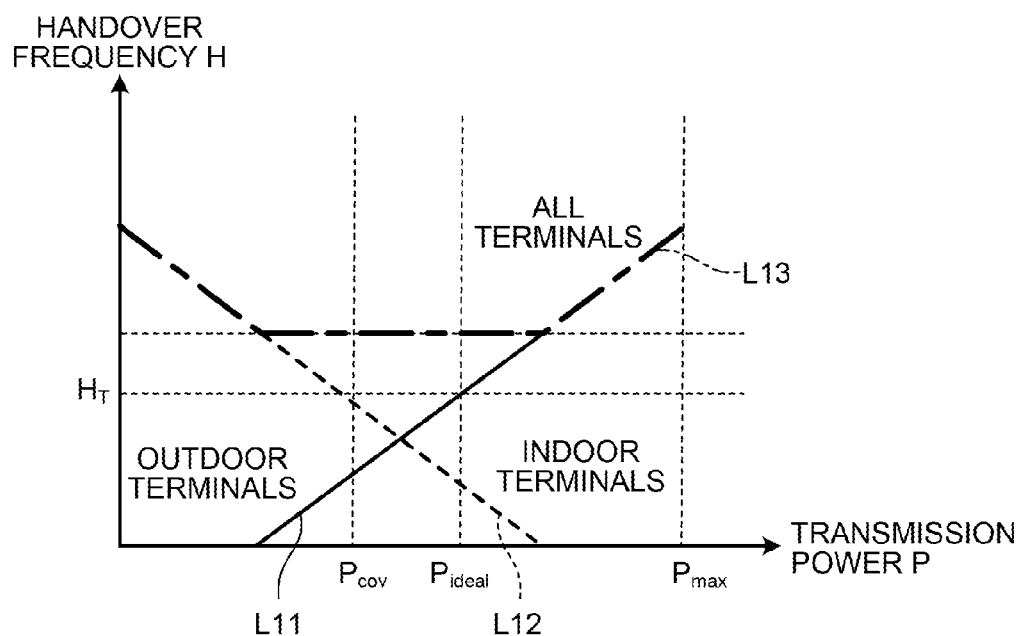
FIG. 16 is an explanatory view of a problem in the related technology.

A femto base station according to the fourth modification has the same configuration as the femto base station 10 according to the embodiment illustrated in FIGS. 1 and 2. Therefore, in the fourth modification, component members similar to those illustrated in the above-described embodiment are designated by similar reference numerals to omit illustration and a detailed description thereof. FIG. 15 is a flow chart for describing operation of the femto base station 10 according to the fourth modification. Since FIG. 15 includes the same processing as FIG. 3 which is referred in description of the operation according to the above-described embodiment, common steps are designated by reference numerals having an identical tailing numeral, and a detailed description thereof is omitted. Specifically, the processing of steps W1 to W5 in FIG. 15 corresponds to processing of steps S1 to S5 illustrated in FIG. 3, respectively.

In W6 peculiar to the fourth modification, the terminal count determination unit 16 of the femto base station 10 determines whether or not the number of the terminals connected to the femto base station 10 is less than a threshold value $M_1$. If the number of terminals connected to the own cell <threshold value $M_1$ is satisfied as a result of the determination (Yes in W6), the processing shifts to W4. Contrary to this, if the number of terminals connected to the own cell ≥threshold value $M_1$ is satisfied (No in W6), the femto base station 10 omits each processing of W4 and W5 and does not perform coverage control (for decrease or expansion). This makes it possible to perform coverage control in consideration of the number of terminals connected to the own cell C10. Accordingly, the situation where the terminals which have requested handover from other cells are not accessible to the femto base station 10 is avoided.

Here, the threshold value $M_1$ differs depending on, for example, the installed environment of the femto base station 10 (inside of shops and/or stations), the number of users, the type of days (holidays), and the like. However, the threshold value $M_1$ is desirably a value slightly lower than an upper limit of the number of terminals in connection with the femto base station 10. For example, when the upper limit of the number of terminals in connection with the femto base station 10 is thirty two, the threshold value $M_1$ is about twenty eight to thirty in consideration of allocation to emergency calls and a buffer. When the upper limit of the number of terminals in connection with the femto base station 10 is sixty four, the threshold value $M_1$ is about sixty, for example.

In the above-described embodiment and modifications, it is assumed to suppress handover between the femto base stations where avoidable handover tends to occur and the macro base stations. However, the coverage control technique according to the present embodiment is applicable not only to the femto base stations but also to general small-size cell base stations, such as pico base stations, which can variably control the coverage.

The above-described embodiment and modifications have been described with smartphones as a terminal. However, the present invention is applicable not only to the smartphones but also to various communication apparatuses which are handed over between the cells formed by base stations, such as cellular phones and personal digital assistants (PDAs). The measurement information and/or communication quality reported to the base stations by the terminals are not limited to a signal to interference and noise ratio (SINR) value, but may be a received signal strength indication (RSSI) value indicative of radio wave intensity, a reference signal received power (RSRP) value, and a reference signal received quality (RSRQ) value. Or the measurement information and/or communication quality may also be expressed as channel state information (CSI) such as a signal to interference ratio (SIR), a channel quality indicator (CQI), a precoding matrix indicator (PMI), a rank indicator (RI).

Furthermore, the respective component members of the femto base station 10 in FIG. 1 may have physical constitutions different from those illustrated in the drawings. More specifically, the concrete distribution/integration of each apparatus is not limited by illustrations, but the whole or part of each apparatus may functionally or physically be distributed/integrated in arbitrary units depending on various kinds of loads, use conditions, and the like. For example, the handover monitoring unit 11, the terminal determination unit 12 and the handover delay unit 15, or the terminal determination unit 12 and the terminal count determination unit 16 may each be integrated as one component member. On the contrary, the terminal determination unit 12 may be distributed into a unit of determining the presence of the connection history (S22 and S23 in FIG. 4) and a unit of determining the length of connection time (S24 in FIG. 4). The memory that stores calculation results of the handover frequency and/or various threshold values may be prepared as an external device of the femto base station 10 and be connected via a network or a cable.

In the foregoing description, individual configurations and operations were described in the respective embodiment and modifications. However, the femto base station 10 according to each of the embodiment and modifications may include component members peculiar to other embodiments and/or modifications. Moreover, the embodiments and modifications may be combined in an arbitrary form including not only a combination of two of the embodiments and/or modifications, but also a combination of three or more of the embodiments and/or modifications. For example, the frequency determination technique for all the terminals according to the second modification is applicable not only to the first modification but also to the third and fourth modifications. The coverage control technique in consideration of the number of terminal connections according to the fourth modification is also applicable not only to the embodiment but also to the first to third modifications.

According to one aspect of the base station disclosed in this application, unnecessary handover can be suppressed.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A base station comprising:
a first determination unit that determines whether a terminal in connection with the base station is a terminal passing a cell of the base station;
a calculation unit that calculates handover frequency having a predetermined value of the terminal determined as the passing terminal by the first determination unit; and
a control unit that controls transmission power in accordance with the frequency calculated by the calculation unit, wherein
the control unit controls coverage based on presence of a history of connection of the passing terminal to the base station in past predetermined time and based on time of current connection of the passing terminal to the base station to suppress avoidable handover caused by the terminal which temporarily passes the cell, wherein
when the frequency calculated by the calculation unit is a second predetermined value or more, the control unit decreases the transmission power, and when the frequency calculated by the calculation unit is less than the second predetermined value, the control unit increases the transmission power.

2. The base station according to claim 1, wherein the first determination unit determines as the passing terminal a terminal which has no history of connection to the base station in the past and whose connection time to the base station is less than a first predetermined value.

3. The base station according to claim 1, wherein
the calculation unit calculates handover frequency of a terminal determined not to be the passing terminal, and
the control unit controls the transmission power in accordance with the frequency calculated by the calculation unit.

4. The base station according to claim 3, further including a delay unit that performs control for delaying timing of handing over the terminal determined not to be the passing terminal to a cell other than the cell of the base station.

5. The base station according to claim 4, wherein the delay unit commands the terminal determined not to be the passing terminal to change reporting conditions, which are conditions for the terminal to report measurement information to the base station, the measurement information being used in the handover.

6. The base station according to claim 4, wherein the delay unit changes conditions for executing the handover by using the measurement information reported to the base station by the terminal determined not to be the passing terminal.

7. The base station according to claim 1, wherein
the calculation unit calculates handover frequency of all the terminals in connection with the base station, and
when the frequency calculated by the calculation unit is a second predetermined value or more, the control unit decreases the transmission power based on the handover frequency of the terminal determined not to be the passing terminal, and when the frequency calculated by the calculation unit is less than the second predetermined value, the control unit increases the transmission power based on the handover frequency of all the terminals in connection with the base station.

8. The base station according to claim 1, wherein
the calculation unit calculates communication quality of a terminal determined not to be the passing terminal, and
the control unit controls the transmission power in accordance with the frequency and the communication quality calculated by the calculation unit.

9. The base station according to claim 1, further including a second determination unit that determines whether or not number of the terminals connected to the base station is less than a third predetermined value, wherein
when the second determination unit determines that the number of the terminals is less than the third predetermined value, the calculation unit calculates the handover frequency of the terminals passing the cell of the base station, and
the control unit controls the transmission power in accordance with the frequency calculated by the calculation unit.

10. The base station according to claim 1, wherein
the calculation unit calculates a communication rate of the terminal determined not to be the passing terminal, and
the control unit controls the transmission power in accordance with the frequency and the communication rate calculated by the calculation unit.

11. A method for controlling a base station, the method comprising:
determining whether or not a terminal in connection with the base station is a terminal passing a cell of the base station, by a processor;
calculating handover frequency having a predetermined value of the terminal determined as the passing terminal, by the processor; and
controlling transmission power in accordance with the calculated frequency, by the processor, wherein
the controlling includes controlling coverage based on presence of a history of connection of the passing terminal to the base station in past predetermined time and based on time of current connection of the passing terminal to the base station to suppress avoidable handover caused by the terminal which temporarily passes the cell, wherein
the controlling includes decreasing, when the frequency calculated at the calculating is a second predetermined value or more, the transmission power, and the controlling includes increasing, when the frequency calculated at the calculating is less than the second predetermined value, the transmission power.

* * * * *